United States Patent
Nasiri et al.

(10) Patent No.: US 7,267,260 B2
(45) Date of Patent: Sep. 11, 2007

(54) APPARATUS FOR HOLDING A FIBER ARRAY

(75) Inventors: Steven S. Nasiri, Saratoga, CA (US); Janusz Liberkowski, San Jose, CA (US); Zhenfang Chen, Cupertino, CA (US); Jeff Jarfa, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 10/687,113

(22) Filed: Oct. 15, 2003

(65) Prior Publication Data

US 2004/0081420 A1 Apr. 29, 2004

Related U.S. Application Data

(62) Division of application No. 10/236,471, filed on Sep. 5, 2002, now Pat. No. 6,823,127.

(51) Int. Cl.
*B23K 35/14* (2006.01)
(52) U.S. Cl. .................................... 228/246; 228/179.1
(58) Field of Classification Search ... 228/178–180.22, 228/245–262; 385/137, 134
See application file for complete search history.

(56) References Cited

U.S. PATENT DOCUMENTS

| | | | |
|---|---|---|---|
| 4,707,067 A * | 11/1987 | Haberland et al. ............. 385/90 |
| 4,830,450 A | 5/1989 | Connell et al. | |
| 5,185,846 A | 2/1993 | Basavanhally et al. | |
| 5,281,301 A | 1/1994 | Basavanhally | |
| 5,348,488 A * | 9/1994 | Green et al. ................. 439/140 |
| 5,394,498 A | 2/1995 | Hinterlong et al. | |
| 5,658,364 A | 8/1997 | DeVore et al. | |
| 5,733,136 A * | 3/1998 | Kajiwara ..................... 439/259 |
| 5,808,533 A * | 9/1998 | Buscher et al. ............. 335/202 |
| 5,848,903 A * | 12/1998 | Gammenthaler ............. 439/79 |
| 6,027,253 A | 2/2000 | Ota et al. | |
| 6,210,046 B1 * | 4/2001 | Rogers et al. ................. 385/74 |
| 6,216,939 B1 * | 4/2001 | Thackara ................. 228/124.6 |
| 6,302,593 B1 * | 10/2001 | Haake ......................... 385/74 |
| 6,470,123 B1 | 10/2002 | Sherman et al. | |

(Continued)

FOREIGN PATENT DOCUMENTS

DE   003537653 A1 *   4/1987

(Continued)

*Primary Examiner*—Jonathan Johnson
(74) *Attorney, Agent, or Firm*—Blakely, Sokoloff, Taylor & Zafman LLP (57) ABSTRACT

Optical fibers are inserted and bonded in a two dimensional array of feedthroughs provided by an insert having a top plate, a bottom plate and a sandwiched spacer plate. Top and bottom plate feature funnel shaped hole sections that capture the approaching fiber end during its insertion. The funnel sections terminate in narrow hole sections that tightly hold the inserted fiber ends. Having top and bottom plate spaced apart provides for high angular precision of the bonded fiber ends with minimal fabrication effort of the insert. Optical fibers may be combined in linear arrays and simultaneously inserted significantly reducing assembly efforts. The insert is attached to a fiber housing and hermetically sealed within an external housing, which features a glass plate to provide beam propagation to and from the fiber ends. An optical gel fills the gap between the insert's output face and the glass plate.

6 Claims, 6 Drawing Sheets

U.S. PATENT DOCUMENTS

| | | | |
|---|---|---|---|
| 6,483,960 B2 * | 11/2002 | Schroedinger | 385/14 |
| 6,618,541 B2 | 9/2003 | Kaiser et al. | |
| 6,653,724 B1 * | 11/2003 | Kim et al. | 257/684 |
| 6,659,655 B2 * | 12/2003 | Dair et al. | 385/92 |
| 6,750,778 B1 * | 6/2004 | Chen | 340/693.5 |
| 6,769,932 B1 * | 8/2004 | Daoud | 439/532 |
| 6,819,856 B2 * | 11/2004 | Dagley et al. | 385/134 |
| 6,823,127 B2 * | 11/2004 | Nasiri et al. | 385/137 |
| 6,867,371 B2 * | 3/2005 | Daoud et al. | 174/65 G |
| 2001/0051028 A1 | 12/2001 | Gutierrez et al. | |
| 2002/0154882 A1 | 10/2002 | Moran | |
| 2003/0002804 A1 | 1/2003 | Trezza et al. | |
| 2003/0007758 A1 | 1/2003 | Rose et al. | |
| 2003/0161367 A1 * | 8/2003 | Chen et al. | 372/36 |
| 2004/0047582 A1 * | 3/2004 | Nasiri et al. | 385/137 |
| 2004/0081420 A1 * | 4/2004 | Nasiri et al. | 385/137 |
| 2004/0211774 A1 * | 10/2004 | Daoud et al. | 220/4.02 |
| 2005/0032420 A1 * | 2/2005 | Iwasaki | 439/571 |

FOREIGN PATENT DOCUMENTS

| | | | |
|---|---|---|---|
| JP | 362229884 A | * | 10/1987 |
| JP | 2003249773 A1 | * | 9/2003 |

* cited by examiner

APPARATUS FOR HOLDING A FIBER ARRAY

CROSS REFERENCE

This application is a divisional of U.S. patent application Ser. No. 10/236,471, filed on Sept. 5, 2002, now U.S. Pat. No. 6,823,127 and claims priority therefrom under 35 U.S.C. § 120. The priority application is currently pending. The present application cross-references U.S. patent application Ser. No. 10/236,470, filed Sept. 5, 2002, and U.S. patent application Ser. No. 09/866,063, filed May 21, 2002, both of which are incorporated herein by reference.

FIELD OF THE INVENTION

The present invention relates to devices for holding optical fibers, and in particular to devices for holding optical fibers organized in arrays.

BACKGROUND

Many fields of technology have benefited from the ability to transmit signals via waveguides such as optical fibers. In particular, optical fibers have enabled the construction of various types of local and long-distance communications networks. The signals propagating through an optical network are typically launched and out-coupled from individual optical fibers through their end facets. For example, in optical network components such as optical fiber switches and optical fiber cross connects, signals are out-coupled from one fiber and in-coupled into another fiber.

In accordance with well-known principles of optics, light emitted from the end facet of a fiber diverges in a cone-shaped pattern determined by the numerical aperture N.A.=n $\sin\theta_{max}$ of the fiber. In this equation n is the refractive index into which the fiber emits the light and $\theta_{max}$ is the half angle of the cone shaped emission pattern.

In most optical networks and/or components it is important to minimize loss when connecting an optical fiber to an optical system. To accomplish this, the diverging light beams emitted by the optical fibers in the array are typically collimated and/or refocused by lenses. To effectively couple the individual fibers of a fiber array with other optical components or systems, the individual fibers and all other optical elements along the emitting and/or received light paths need to be precisely positioned and aligned. Specifically, precise alignment means that 1) light is emitted from each optical fiber at a precisely known position within the array, 2) light is emitted from each optical fiber at substantially the same angle (i.e., the optical fibers are aligned substantially parallel to each other), 3) light is emitted from each optical fiber at substantially the same distance from the collimating and/or refocusing lenses, and 4) each optical fiber has substantially the same numerical aperture.

The prior art teaches aligning optical fibers in an array of V-grooves. Such arrays typically include a small number of optical fibers (e.g., up to about 64) arranged in parallel in a single plane. For example, U.S. Pat. No. 6,027,253 to Ota et al. discloses an optical fiber array including a V-groove substrate having V-grooves on which optical fibers are arranged and a fiber fix substrate for fixing the optical fibers arranged on the V-grooves. Furthermore, V-groove arrays have also been adapted to requirements that fiber arrays be hermetically sealed to prevent ambient air from entering into the package holding the fiber array. A sealed fiber array and method for its manufacture using V-grooves is taught in U.S. Pat. No. 6,215,944 to Ota et al. Additional improvements to V-groove chips for fiber arrays having a wick stop trench to prevent adhesive moving via capillary action along the length of the V-groove are discussed in U.S. Patent Application Publication 2002/0003933 to Sherrer et al.

Other approaches to providing hermetically sealed packages for fibers are also known. For example, U.S. Pat. No. 6,216,939 to Thackara teaches a method for making a hermetically sealed package comprising at least one optical fiber feedthrough. The package has at least one solder perform between a sealing surface of a lid and a sealing surface of a housing. Applying pressure and heat so as to press the fiber or fibers into the solder seals the assembly. More general teaching on how to achieve fiber optic-to-metal connection seals can be found in U.S. Patent No. 5,658,364 to DeVore et al.

Fiber arrays disposed on substrates with V-grooves and lodged between substrates as taught by Thackara are mostly suitable for constructing single-plane arrays. As the number of fibers increases such arrays become unwieldy. Many applications like, for example, in telecommunications are expected to require optical fiber arrays including more than one hundred (and potentially more than one thousand) optical fibers. Unfortunately, single-plane arrays are impractical for such applications. Moreover, efficient coupling of light output by an optical fiber array into another optical system becomes more difficult when aligning very large quantities of optical fibers than when dealing with only a few optical fibers.

Alternative approaches have been proposed in the prior art where high precision optical fiber arrays are more specifically adapted for dealing with larger numbers of fibers and two dimensional fiber arrays. For example, U.S. Pat. No. 5,907,650 to Sherman et al. teaches a high precision optical fiber array connector and method. In a most notable embodiment, the fibers are arrayed and positioned via openings of two masks spaced by a sandwiched layer. The openings are fabricated by laser cutting. A plurality of optical fibers include fiber ends having substantially truncated conical side surfaces that extend through the openings. When the conical surfaces engage the mask opening walls, a bonding material is applied to the mask forward face and exposed tips. After curing of the bonding material, the forward face is grinded and polished such that the exposed tips are made planar with the bonding material. The invention requires conical shaping of the fiber ends. Etching techniques are described as primary conical shaping techniques. The centering of a single fiber within an opening is accomplished as a line contact between the conically shaped cladding and an opening edge, which may result in damage of the cladding and an eventual loss in alignment precision. Also, all fibers have to be held with a certain force inside the openings to assure contact between the conical cladding and the corresponding opening edge during curing of the bonding material. In cases with a high number of fibers it may be difficult to hold each individual fiber with the required force during the curing process. The conical shape of the fiber ends is required for finding the openings and for centering the fiber ends in the assembly position. Damages of the fiber ends may occur as an eventual result of failed assembly attempts. Therefore, there exists a need for a method and apparatus that provides precise alignment of optical fibers without special treatment and/or fabrication effort of the fiber ends. The present invention addresses this need.

U.S. Patent Application Publication 2001/0051028 to Gutierrez et al. aims at providing a high-density fiber terminator/connector.

The terminator/connector and method of making it comprise using deep reactive ion etching to etch a plurality of holes in a silicon substrate and placing fibers in the holes. The holes can be cylindrical in shape or non-cylindrical. Micro-machined kinematical alignment mechanisms or locators may be provided to position the optical fibers at the centers of the holes. The alignment mechanism includes elastic flaps concentrically placed around the assembled fibers and are intended to snuggly hold the fibers in position. Since the flaps deflect angularly a snuggly contact is questionable. Also, the flexible nature of the alignment mechanism may render it sensitive to bending momentums induced by the fibers themselves. To keep such bending moments to a minimum, pre alignment of the fibers is provided by slim conical hole sections fabricated below the flaps. Unfortunately, such slim conical hole sections result in a relatively small entry diameter making an insertion of the fiber end difficult to accomplish. Therefore, there exists a need for a structure that provides for an independent dimensioning of an insertion cone. The present invention addresses this need.

Although the teachings of Sherman and et al. and Gutierrez et al. address a number of the challenges in the way of a high precision array of optical fibers, their solutions are not sufficiently precise and robust for large arrays of optical fibers. What is needed is an optical fiber array that can accommodate a large number of fibers, achieve hermetic sealing and preserve excellent alignment of the fibers including planarity, parallel alignment, relative position between the fibers as well as absolute position of fibers in the array. Furthermore, it would be highly advantageous if such array would permit tuning of the orientation of the array in the holder.

OBJECTS AND ADVANTAGES

In view of the shortcomings of the prior art, it is an object of the present invention to provide an apparatus for holding optical fibers in an array that satisfies the requirements of high alignment precision between fibers themselves and with respect to external devices. Specifically, the device of the invention is to provide excellent planarity, parallel alignment, relative position and absolute position of the optical fibers of the array.

It is another object of the invention to ensure that the device be sufficiently robust such that the precisely aligned fibers preserve their alignment over time.

It is yet another object of the invention to provide for a hermetic seal between the fibers, and especially the fiber ends and the external environment.

It is another object of the invention to provide the fiber housing with hermetic sealing from the external environment of the apparatus while attached to the apparatus Still another object of the invention is to provide a mechanism for tuning the orientation of the array in the device.

These and other objects and advantages will become apparent upon reading the following description.

SUMMARY

The objects and advantages of the invention are achieved with the aid of an insert for holding at least one optical fiber, and typically a large array of optical fibers. The insert has a top plate, a bottom plate and a spacer plate in the middle. An array of feedthroughs is provided by the insert for easily receiving and precisely positioning optical fibers. Each feedthrough includes two narrow hole sections on both ends of a wide hole. The wide hole is formed into the spacer plate, the narrow hole sections are fabricated in the top plate and the bottom plate. Adjacent to each narrow hole section is an expanding hole section that operates as a funnel during insertion of a fiber in the feedthrough. A fiber end is easily inserted in a feedthrough since the expanding sections capture the fiber end and center it on the narrow hole sections while the fiber end is moved forward. Consequently, a large number of fibers may be easily inserted and tightly positioned within the insert without need to particularly shape the fiber ends. Also, there is no need to hold the fiber ends in a certain position along the feedthroughs' axes during the bonding of the fibers in the insert. This additionally simplifies the assembly procedure.

Spacing the two narrow hole sections apart provides for two defined positions for each fiber end. The orientation of the fiber end at the level of the output face remains substantially unaffected by eventual bending of the fiber in the proximity of the insert that might occur prior to bonding the fibers. As an advantageous result, the tilting of the fiber in the two narrow hole sections is so small that may be neglected.

In a preferred embodiment, the insert is employed in an apparatus designed for holding an optical fiber or an array of optical fibers. The apparatus has a fiber housing for mounting the insert. In one embodiment, the fiber housing has a front portion and the insert is mounted on the front portion. The fiber housing provides hermetic sealing from the external environment of the apparatus while attached to the apparatus.

The external housing has a glass plate disposed in a plane-parallel orientation relative to the insert. Thus, when the fiber housing is placed inside the external housing the glass plate is located parallel and next to the output face. Furthermore, in order to ensure proper optical out-coupling from the optical fibers, an optical gel is interposed between the glass plate and the insert.

A lens plate is positioned on top of the glass plate. The lens plate has a number of lenses arrayed in correspondence to the feedthrough array. Precise positioning of the lens plate is provided by an adjustment device that holds the lens plate while optical tests are performed. Once the optimal position of the lens plate is set, the lens plate is soldered to the external housing.

The details of the invention are presented in the below description with reference to the attached drawing figures.

BRIEF DESCRIPTION OF THE FIGURES

FIG. 2a shows an ideal assembly condition of the insert's individual plates and a fiber end. FIG. 2b shows an exemplary worst-case assembly condition.

DETAILED DESCRIPTION

Figure 1:
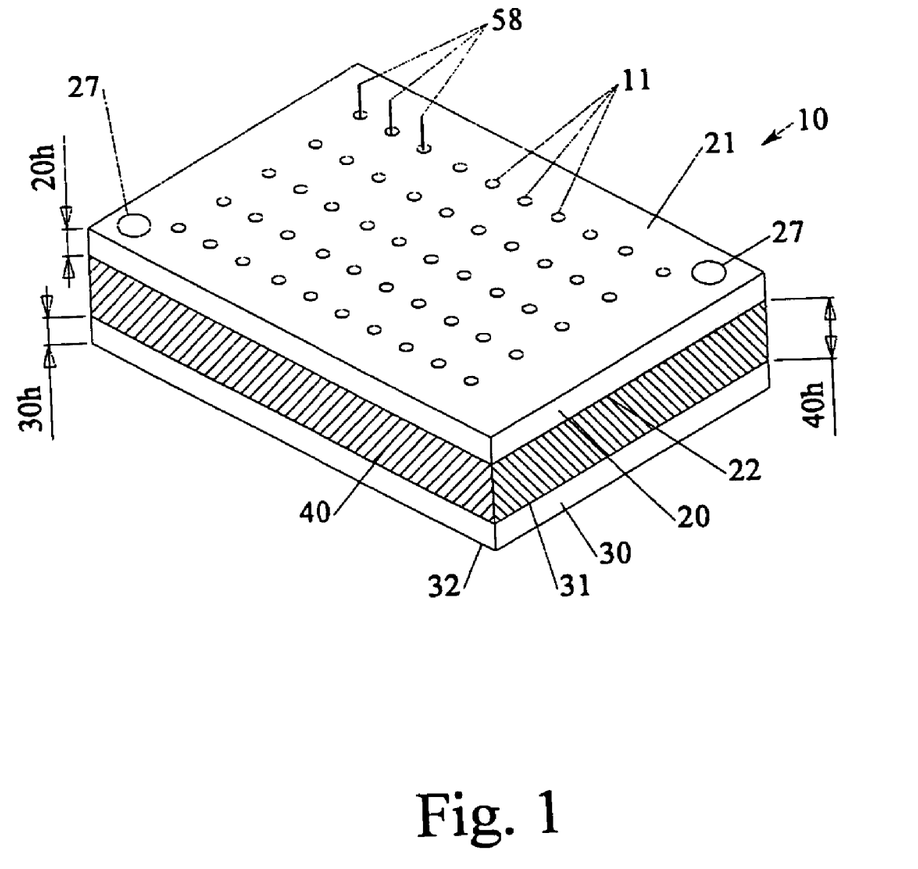
FIG. 1 depicts an isometric view of an insert in accordance with the invention.

The invention will be best understood by initially referring to an insert 10 as show in FIG. 1. Insert 10 has a top plate 20 and a bottom plate 30. A spacer plate 40 is sandwiched between plates 20, 30. All plates 20, 30, 40 are preferably made of silicon wafers or other suitable material. In the present embodiment, plates 20, 30 have a height 20$h$ and 30$h$ of about 500 μm, and spacer plate 40 has a height 40$h$ of about 1,000 μm Even though this heights 20$h$, 30$h$, and 40$h$ have proven advantageous for the purposes of the present invention, the scope of the invention is not limited by specific values of them.

Figure 2A:
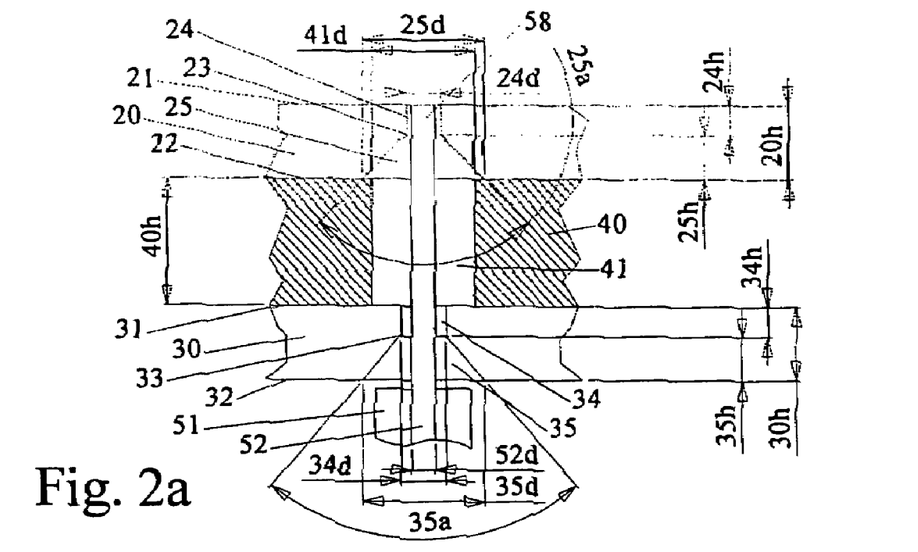
FIGS. 2a, 2b illustrate a cross-sectional view of a feedthrough of the insert of FIG. 1.
Figure 2B:
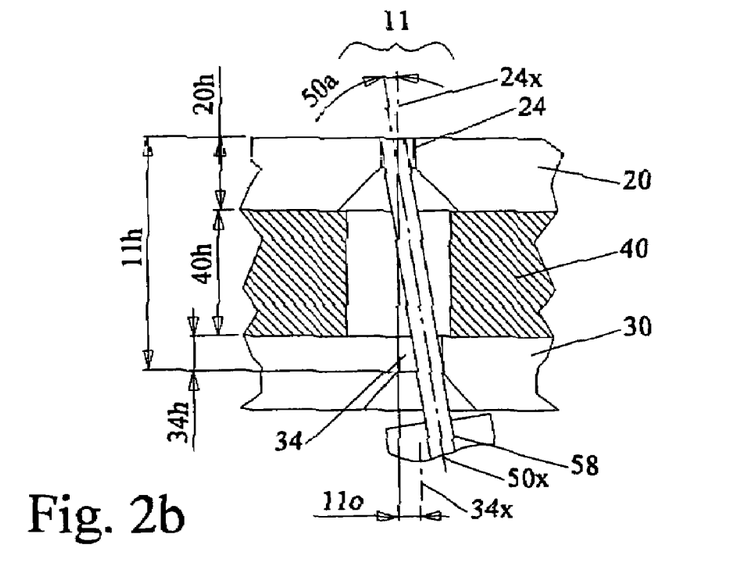

The insert 10 has a number of feedthroughs 11, which are explained in more detail in FIGS. 2$a$ and 2$b$. The feedthroughs 11 hold the fiber ends 58. The insert 10 is dimensioned to provide sufficient space for a predetermined number of fiber ends 58 fixedly held preferably in rows and columns. An exemplary insert 10 may have about 30 rows and 40 columns. Minimizing the spacing between the feedthroughs 11 is limited by a minimum amount of contact area between the plates 20, 30, 40 to assure proper bonding of them. In the preferred embodiment, the spacing between individual feedthroughs 11 is about 1000 μm. The insert 10 also provides a peripheral area without feedthroughs 11. Along this peripheral area the insert 10 is bonded with its insertion face 32 to a fiber housing 60 (see FIGS. 3, 6).

Top plate 20 has an output face 21 at which optical beams are emitted and/or received by the fiber ends 58, which are shown in FIG. 1 as extending above the output face 21 as it may be the case during an intermediate assembly step as is described further below.

The plates 20, 30, 40 are bonded together in a well-known fashion. The top plate 20 is bonded with its first attaching face 22 to the top of the spacer plate 40 and the bottom plate 30 is bonded with its second attaching face 31 to the bottom of the spacer plate 40. At the bottom of the bottom plate 30 is an insertion face 32 where the fiber ends 58 are inserted during assembly. Alignment holes 27 are fabricated in each of the plates 20, 30, 40 to provide accurate alignment prior to the well-known bonding of them.

Referring now to the cross-sectional views of FIGS. 2$a$ and 2$b$ the elements of a single feedthrough 11 are explained in detail. In order to precisely position the fiber end 58 at the level of the output face 21, a sufficient length of the fiber end 58 needs to be fixedly held. This is particularly important in cases, where the feedthrough 11 has to have sufficiently wide cross section(s) to provide for an easy assembly.

Unfortunately, the effort and cost for fabricating precise holes increase more than proportional with the hole depth. In the present invention, this problem is addressed by providing first and second narrow hole sections 24, 34 positioned along the upper and lower end of the feedthrough 11. In that way, the narrow hole sections 24, 34 are fabricated only with their depths 24$h$, 34$h$ while a positioning relevant feedthrough height 11$h$ is provided. In an exemplary embodiment, the depths 24$h$, 34$h$ may be in the range between 100 μm and 200 μm and the feedthrough height 11$h$ in the range between 1600 μm and 1700 μm. As can be seen in FIG. 2$b$, the feedthrough height 11$h$ sums from top plate height 20$h$, spacer plate height 40$h$ and second narrow hole height 34$h$.

Postioning precision includes an angular offset 50$a$, which is defined as the angle between the fiber end's 58 axis 50$x$ and a normal of the output face 21. In FIG. 2$b$, the offset angle 50$a$ is drawn between the fiber axis 50$x$ and the first hole axis 24$x$, which is also normal to output face 21. For the purpose of the present invention it is desirable to keep the angular offset 50$a$ to a minimum.

Since the insert 10 is fabricated from individual plates 20, 30, 40, positioning inaccuracies between the individual plates 20 and 30 may result in an offset 11$o$ between the narrow hole axes 24$x$ and 34$x$. The offset 11$o$ eventually contributes to the angular offset 50$a$. The oversize of the narrow hole sections 24, 34 may also contribute to the angular offset 50$a$. In that context, FIG. 2$b$ depicts a worst-case assembly condition where misalignment between the plates 20, 30 and hole oversizes add up in the most unfavorable fashion. In such case, a maximum for the angular offset 50$a$ may be defined by the following Equation [1] wherein FH stands for the feedthrough height 11$h$, T equals the top hole diameter 24$d$, B equals the bottom hole diameter 34$d$, D equals the fiber end diameter 52$d$, FO equals the feedthrough offset.11$o$, and α the angular offset 50$a$.

$$\alpha = arctg(FO+T+B-2D/FH) \quad [1]$$

A well-known result of the angular offset 50$a$ is a degradation of the optical signal propagating in and/or out of the fiber end 58, which may be called insertion loss. The following Table A lists exemplary values for the insertion loss in dependence of the contributing elements as presented in the Equation [1]. IL represents the insertion loss in Table A. As can be seen in Table A, the second narrow section 34 may have a slightly large diameter than the first narrow section 24. During insertion of fiber ends 58 in the first narrow section 24 the fiber ends are already pre aligned by the second narrow section 34 providing for a tighter fit of the fiber end 58 at the output face 21 without inhibiting the insertion of it.

TABLE A

| T [μm] | B [μm] | FH [μm] | FO [μm] | D [μm] | α [degrees] | IL [dB] |
|---|---|---|---|---|---|---|
| 127.9 | 129.9 | 1510.0 | 6.0 | 125.0 | 0.40 | 0.09 |
| 127.9 | 129.9 | 1610.1 | 6.0 | 125.0 | 0.37 | 0.08 |
| 127.9 | 129.9 | 1710.0 | 6.0 | 125.0 | 0.35 | 0.07 |
| 127.9 | 129.9 | 1810.0 | 6.0 | 125.0 | 0.33 | 0.06 |
| 127.9 | 129.9 | 1910.0 | 6.0 | 125.0 | 0.32 | 0.06 |
| 127.9 | 129.9 | 2010.0 | 6.0 | 125.0 | 0.30 | 0.05 |

Efficiency of the fiber end's 58 preparation and insertion in the feedthrough 11 is the key to large numbers of fiber ends 58 assembled in a single insert 10. Costly conical shaping of the fiber ends 58 needs to be avoided. Also, the precision with which the fiber end 58 is approached for insertion needs to be kept as low as possible. To accommodate for these needs, a first expanding section 25 is fabricated into the attachment face 22 and a second expanding section 35 is fabricated into the insertion face 32. Both expanding sections 25, 35 are substantially aligned with their adjacent narrow sections 24, 34 such that a first through hole 23 is provided in the top plate 20 and a second through hole 33 is provided in the bottom plate 30.

The expanding sections 25, 35 have a funnel angle 25$a$, 35$a$, which is fabricated by a wet etch operation. As is well-known in the art, the angle created by the wet etch is dependent on the crystallographic orientation of the wafer. In the present invention, preferably a wafer with 1-0-0 crystallographic orientation is used, which produces funnel angles 25$a$, 35$a$ of 115°. This angle provides sufficient funnel widths 25$d$, 35$d$ for given section heights 25$h$, 35$h$. At the same time, the expanding sections 25, 35 are sufficiently steep such that the tip of the fiber end 58 may slide along their walls towards the narrow sections 24, 34. The fiber tip does not require special shaping and can be inserted when approached within the widths 25$d$, 35$d$.

In the preferred embodiment, the cladding 51 is removed from the fiber end 58 prior to assembly and only a bare fiber 52 is inserted in the feedthrough 11. The scope of the invention includes embodiments where the narrow hole diameters 24$d$, 34$d$ are dimensioned to capture the bare fiber 52.

The central portion of the feedthrough 11 is provided by the spacer hole 41 fabricated into the spacer plate 40 with a uniform diameter 41$d$ that roughly corresponds to the width 25$d$. Since the hole 41 does not contribute to the positioning of the fiber end 58, it may be fabricated with reduced precision and consequently with reduced effort and cost. Whereas narrow hole sections 24, 34 are fabricated with highest precision using masks and a deep reactive ion etch. Now, referring to FIG. 3 it is described in detail how the feedthrough 11 is utilized to easily assemble large arrays of fiber ends 58 on the insert 10. The teachings presented above for a single feedthrough 11 apply to an entire feedthrough array distributed in the insert 10 as is exemplarily shown in FIGS. 1, 3. To take advantage of the reduced assembly accuracies provided by the expanding sections 25, 35 a number of fiber ends 58 may be arrayed prior to insertion. A flexible sheet 57 may elastically hold a number of optical fibers 50 (see FIGS. 3, 6) fanning out from a fiber string 54 at one end such that a number of fiber ends 58 stick out at the opposing other end in a substantially parallel fashion and with a spacing that corresponds approximately to the spacing of a single row of feedthroughs 11.

The accuracy of the spacing between the fiber ends 58 arrayed on the sheet 57 has to be merely within the range of the second funnel width 25$d$. A multitude of fiber ends 58 may be inserted simultaneously with an effort comparable to that for inserting a single fiber end 58. In a case where forty fiber ends 58 are provided on a single sheet 57, the insertion process may be substantially shortened also by a factor forty. This example is solely presented for demonstrating a main advantage of the present invention without any claim of accuracy thereof. Details about the sheet 57 and the associated parts are found in the U.S. patent application, Ser. No. 09/866.063, filed May 21, 2002, which is hereby incorporated by reference.

Figure 3:
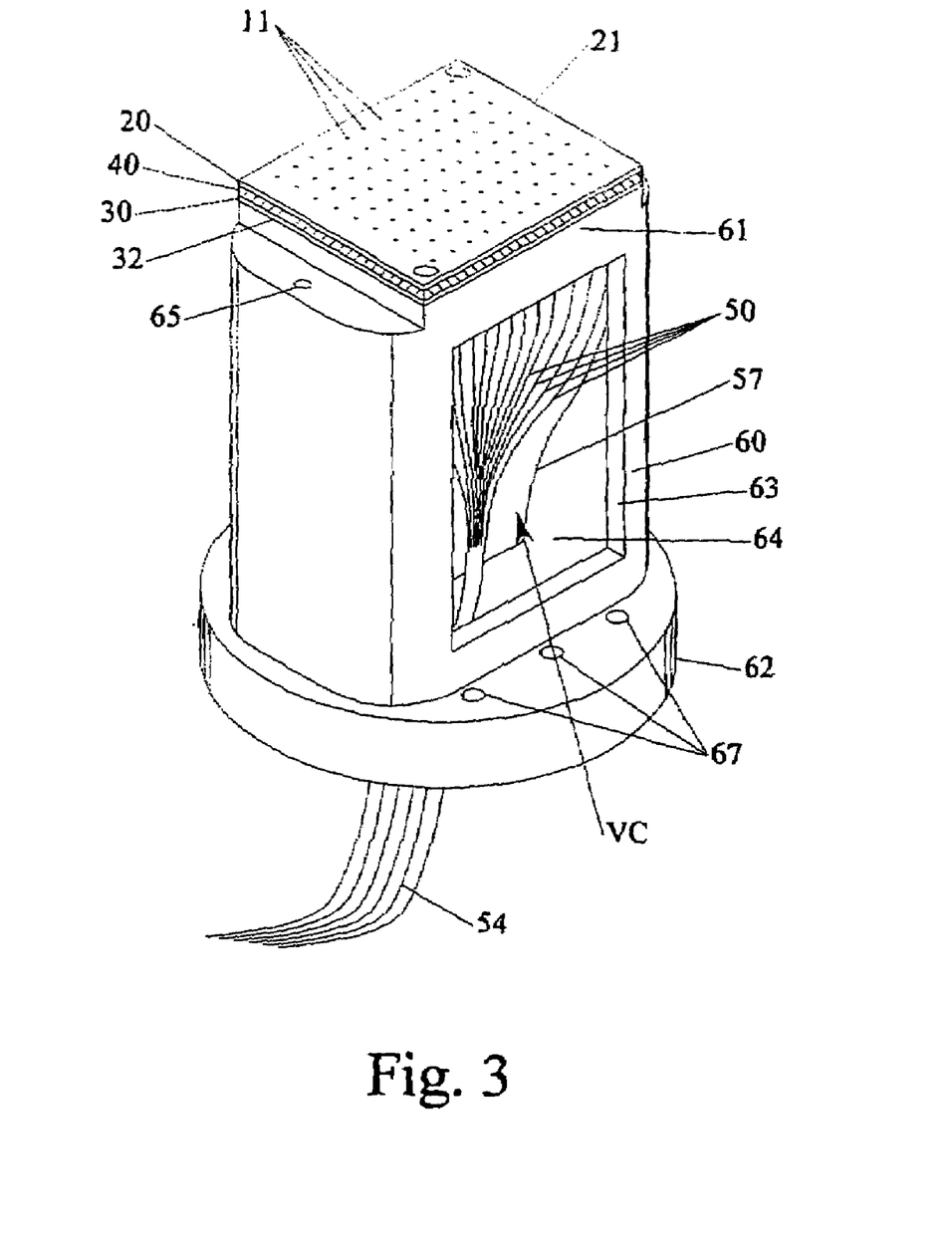
FIG. 3 shows a perspective view of the insert of FIG. 1 attached to a fiber housing.

The insert 10 is a very thin and fragile structure. To integrate it in a larger assembly it is circumferentially attached in a well-known fashion on the top portion 61 of the fiber frame 60. The expanding sections 35 remain freely accessibly at the inside of the fiber frame 60. The fiber frame 60 has a lengthy shape extending in insertion direction away from the insertion face 32. At the opposing end, the fiber frame 60 has a flange structure 62 with first assembly holes 67. The fiber frame 60 features further a window 63 through which a number of sheets 57 may be accessed and held for insertion by a vacuum holding device (not shown). The window 63 is also placed and dimensioned to provide visual contact to the insertion face 32 as indicated by arrow VC.

During an initial assembly step, the fiber frame 60 is fixedly held upside down. A sheet 57 is inserted in the fiber frame 60 and temporarily fixed to the vacuum holding device. The vacuum device is moved such that the arrayed fiber ends 58 are in approximate alignment with their predetermined expanding sections 25. Visual monitoring through the window 63 assures proper alignment and insertion of the array of fiber ends 58.

Once the fiber ends 58 are inserted, gravity keeps them in place and the process may be repeated until the insert is populated with fiber ends 58 in a predetermined fashion. Some feedthroughs 11 may remain unpopulated.

Once the insertion process is completed, a first resin may be poured onto the insertion face 32, which is still pointing upwards. After a sufficient curing period, the fiber frame 60 may be turned around such that the output face 21 points upwards. At that assembly stage, the previously applied first resin is cured and fixedly holding the fiber ends 58 within their feedthroughs 11.

In a following step, a temporary barrier (not shown) is placed around the insert. The temporary barrier rises sufficiently above the level of the output face 21 such that a second resin poured onto the output face 21 is prevented from running off. Immediately following the pouring of the second resin, a vacuum is applied to the uncured second resin such that air eventually trapped in the feedthroughs 11 and beneath the second resin may travel to the top. The second resin may outgas and bubble during vacuum application. The vacuum is applied for a short period only such that the second resign may have sufficient time to settle down before the curing begins. Air bubbles and bubbles from outgasing have enough time to travel to the top of the resign away from the output face 21.

After the second resin has cured completely, the temporary barrier is removed. Then, the portions of the second resign and the fiber ends 58 that extend above the output face 21 are removed too. The output face 21 is finally polished whereby a planar and smooth surface is created between the output face 21, the tips of the fiber ends 58 and the second resign filling the gap between the fiber ends 58 and the first narrow section 24. Eventually unpopulated feedthroughs 11 are filled by the second resign as well. The final subassembly includes the fiber frame 60, the insert 10 and a number of optical fibers 50 terminating in the fiber ends 58 on one end and well-known optical connectors on their other ends.

The insertion loss is highly influenced by the surface quality of the fiber ends' 58 tips. Only the slightest scratches, deposits and/or corrosion result in significant disturbance in the beam propagation. To provide optimum protection of the polished output face 21, a glass plate 73 (see FIG. 4, 5, 6) is placed on top of the output face hermetically sealing it off. The process by which this is accomplished is best explained by referring now to FIG. 4.

To successfully seal the output face 21, an optical gel 66 (see FIG. 5) fills the gap between the glass plate 73 and the output face 21. The optical gel 66 has preferably a refractive index that substantially matches the refractive index of the glass plate 73. Entrapped air bubbles need to be avoided in order to assure undisturbed beam propagation through the gel 66 and the glass plate 73. For that purpose and for providing additional sealing of the insert's 10 circumference, an external housing 70 is provided for receiving the pre assembled fiber frame 60 as described under FIG. 3.

Figure 4:
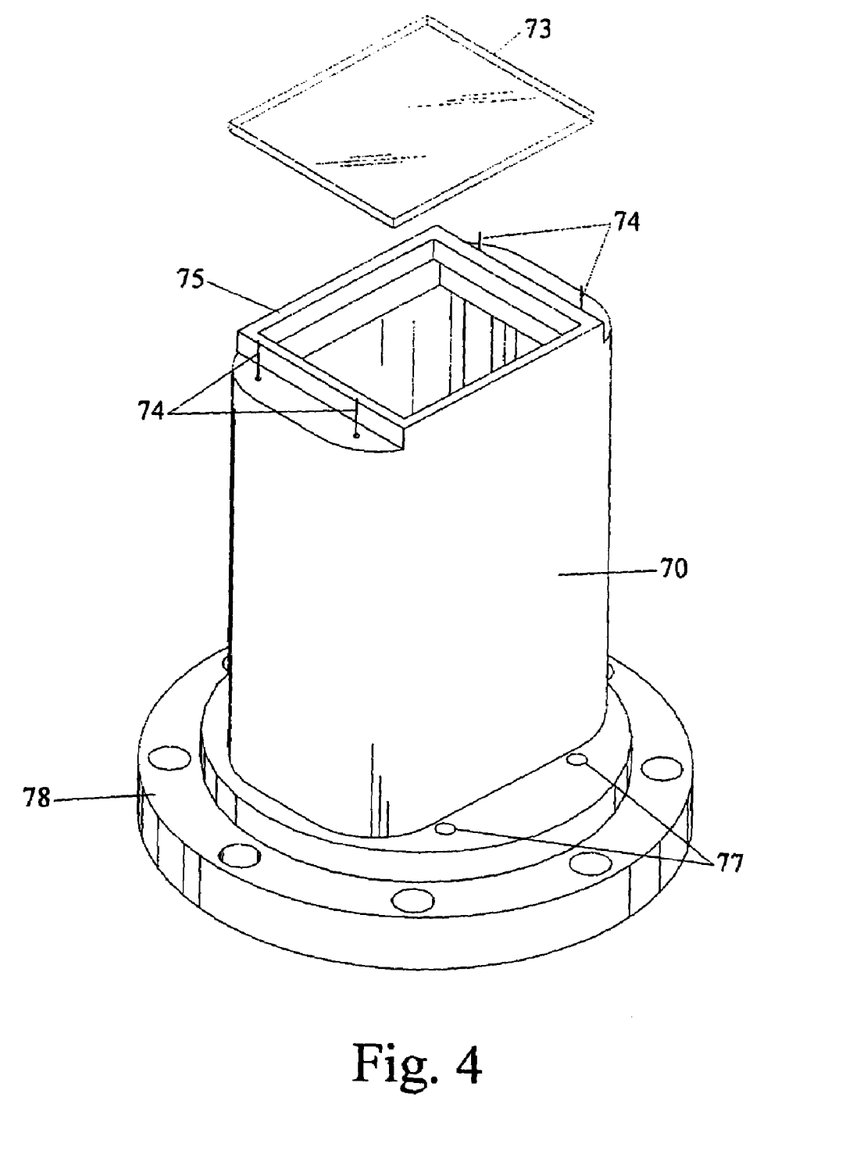
FIG. 4 depicts an external housing with a glass plate.

Prior to assembling the fiber frame 60, the glass plate is bonded to a flange 75 in a fashion similar to that of the insert 10 bonded to the fiber frame 60. The external housing 70 features also assembly holes 77 that correspond to the fiber frame's holes 67 and a flange structure 78 for integrating the final apparatus in another device like, for example, an optical relay station. Solder pins 74 are placed adjacent the flange 75. Their function is explained below with FIG. 6.

After the glass plate 73 has been bonded to the external housing 70, the optical gel 66 may be applied to the polished output face 21. An inventive procedure and apparatus for applying the gel 66 on the output face 21 are described in the concurrently filed U.S. patent application titled "Method and Apparatus for applying an optical gel" of Janusz Liberkowski, which is hereby incorporated by reference.

Figure 5:
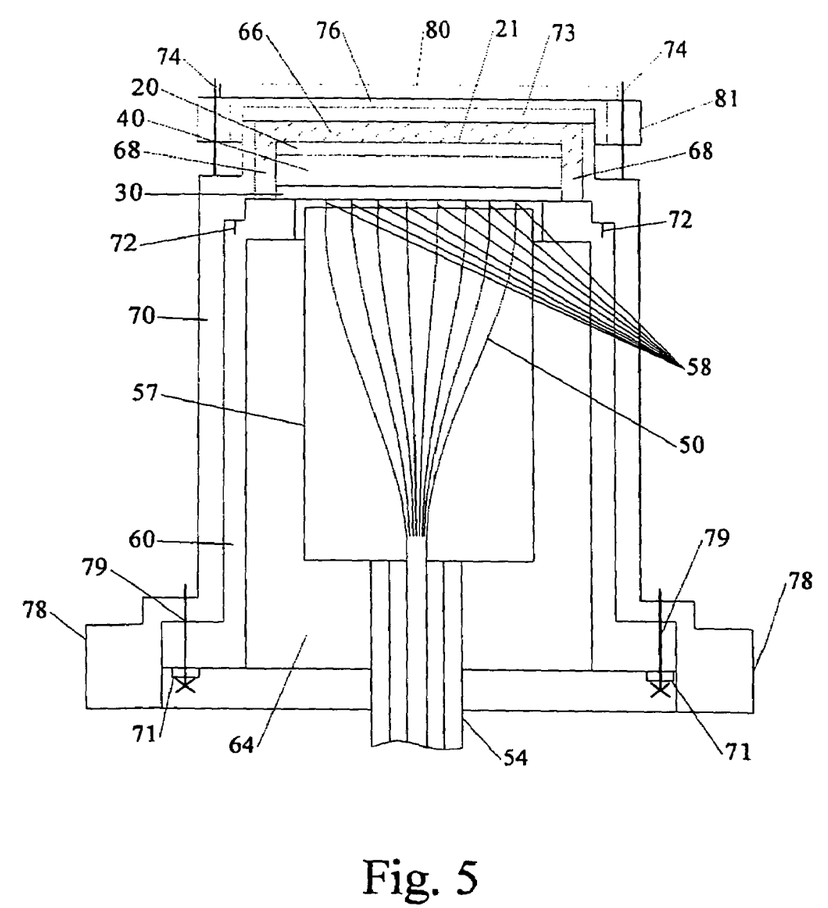
FIG. 5 shows a schematic section view of the final apparatus.

After the optical gel 66 is applied, the fiber frame 60 is inserted in the external housing 70, as shown in FIG. 5. To position the fiber frame 60 inside the external housing 70, well-known alignment features like, for example, alignment pins 72 of the external housing 70 and corresponding alignment holes 65 (see FIG. 3) of the fiber frame 60 may be utilized. Attachment screws 79 screwed in the assembly holes 67, 77 force the output face 21 against the inside of the glass plate 73. Elastic members 71 may be eventually used to gradually squeeze the optical gel 66 out of the gap into a cavity 68 surrounding the insert 10. The surrounding cavity 68 is formed by the insert's 10 circumference, the fiber housing 60 and the external housing 70.

FIG. 5 shows also a lens plate 80 being assembled on top of the glass plate 73. An air gap 76 remains between the glass plate 73 and the lens plate 80. The lens plate is bonded to a frame. 81, which is soldered to pins 74 of the external housing 70 after proper positioning of the lens plate 80.

Figure 6:
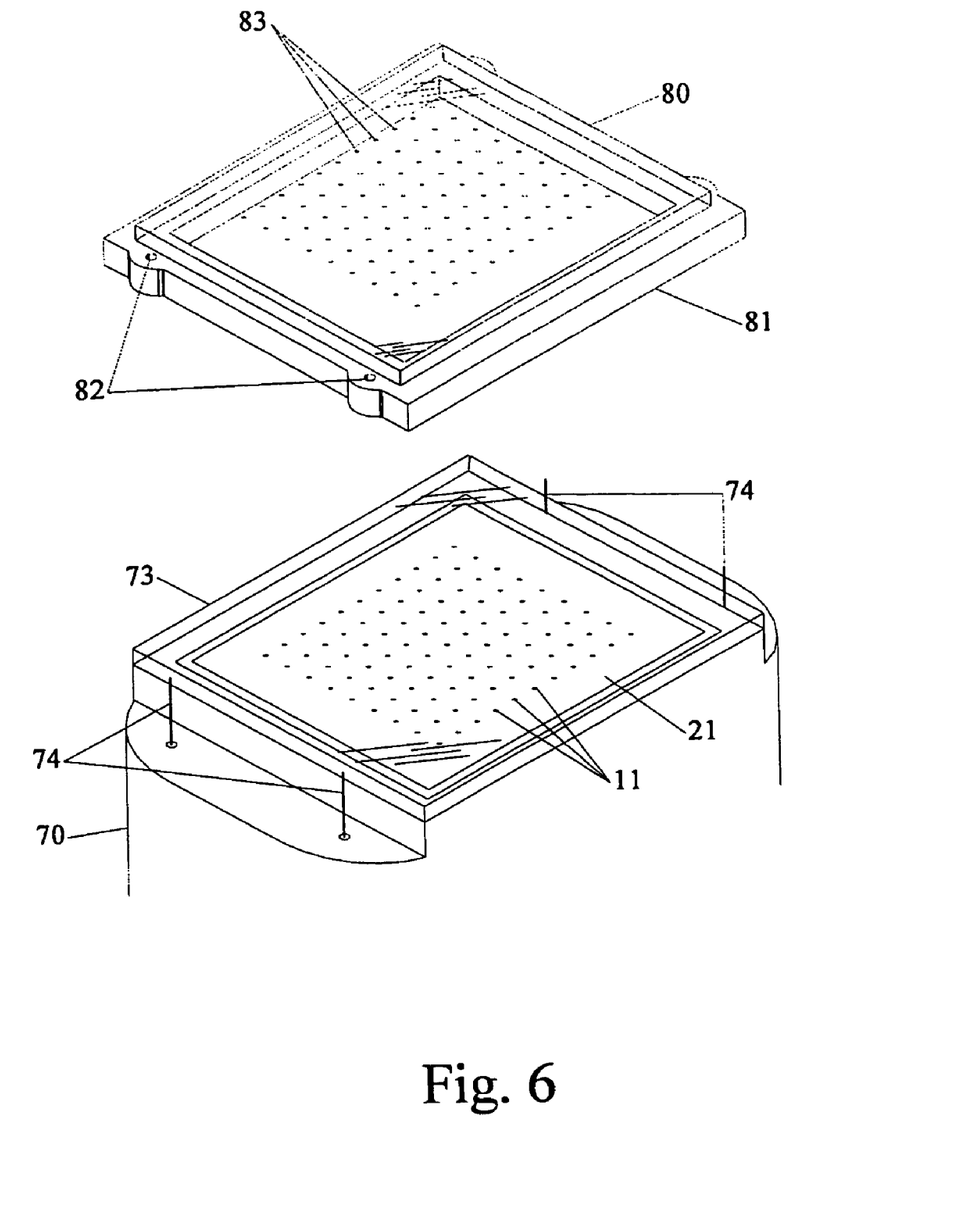
FIG. 6 illustrates a lens plate and the upper portion of the external housing of FIG. 4 with the glass plate attached to it. Through the glass plate is visible the insert of the assembled fiber housing.

Now referring to FIG. 6, the process of positioning and fixing the lens plate 80 is described. A number of individual lenses 83 are arrayed on the lens plate 80 in conjunction with the array of feedthroughs 11. In an initial well-known step the lens plate 80 is aligned relative to the external housing 70 such that the lenses 83 are substantially aligned with the fiber axes 50x. Precise positioning of the lens plate 80 is provided by, an adjustment device that holds the lens plate while optical tests are performed.

Once the lenses 83 are aligned, the lens plate 83 is plan parallel moved in a direction substantially perpendicular to the output face 21 until the emitting light is properly focused by the lenses 83. During this focusing step, a mirror is placed at a predetermined focal plane of the final assembly. The mirror reflects the emitted light back through the lenses 83. As the lenses 83 approach their predetermined assembly position, the emitted light is increasingly focused, which results in a gain of the light mirrored back into the fiber end 58. Once the reflected light reaches a maximum, the lens plate 80 is properly positioned.

During the alignment procedure, the solder pins 74 extend into the solder holes 82 without touching them. After the alignment is completed the position of the lens plate 80 is fixed by soldering the pins 74 within the holes 82.

An additional important utility of the external housing 70 is its sealing function within an optical device like, for example, an optical switching fabric. For that purpose, a seal may be placed on the attachment flange 78 that assists in hermetically sealing the interior of the optical device while the optical connector of the present invention is attached to it.

Accordingly, the scope of the invention described in the specification above is set forth by the following claims and their legal equivalent.

What is claimed is:

1. A process comprising:
   positioning an insert within a housing, wherein the insert holds a plurality of optical fiber ends and wherein the housing has two or more solder pins projecting therefrom;
   positioning a frame on the housing such that the solder pins are received in a corresponding number of holes in the frame, wherein the frame surrounds a lens plate that includes a plurality of individual lenses;
   emitting light from one or more of the plurality of fiber ends through one or more corresponding individual lenses;
   reflecting the emitted light back through one or more of the individual lenses into one or more corresponding fiber ends;
   aligning the frame by moving it parallel and perpendicular to the solder pins until the light reflected into the fiber ends is maximized; and
   fixing the position of the frame relative to the housing by soldering the solder pins within the holes.

2. The process of claim 1 wherein reflecting the emitted light back through one or more of the individual lenses into one or more corresponding fiber ends comprises placing a mirror at a pre-determined focal plane of the lens plate.

3. The process of claim 1 further comprising inserting a glass plate between the output face and the lens plate.

4. process of claim 3 wherein an air gap remains between the glass plate and the lens plate.

5. The process of claim 1 wherein the solder pins project out from an end face of the housing.

6. The process of claim 1 wherein soldering the solder pins within the holes comprises depositing solder in the portions of the holes not occupied by the solder pins.

* * * * *